(12) United States Patent
Wittmer et al.

(10) Patent No.: US 9,721,006 B2
(45) Date of Patent: Aug. 1, 2017

(54) SYSTEMS AND METHODS FOR ENABLING SEARCHES OF A DOCUMENT CORPUS AND GENERATION OF SEARCH QUERIES

(75) Inventors: Philip L. Wittmer, Dayton, OH (US); Peter J. Vanderheyden, Naperville, IL (US); Stuart A. McLean, Liberty Township, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 1075 days.

(21) Appl. No.: 13/052,397

(22) Filed: Mar. 21, 2011

(65) Prior Publication Data

US 2012/0246173 A1    Sep. 27, 2012

(51) Int. Cl.
*G06F 17/30*    (2006.01)

(52) U.S. Cl.
CPC .... *G06F 17/30696* (2013.01); *G06F 17/3064* (2013.01); *G06F 17/30991* (2013.01)

(58) Field of Classification Search
USPC .................................................. 707/705–780
See application file for complete search history.

(56) References Cited

U.S. PATENT DOCUMENTS

| | | | |
|---|---|---|---|
| 5,745,890 A * | 4/1998 | Burrows | 707/741 |
| 5,842,203 A | 11/1998 | D'Elena et al. | |
| 5,926,811 A | 7/1999 | Miller et al. | |
| 6,012,053 A | 1/2000 | Pant et al. | |
| 6,028,605 A | 2/2000 | Conrad et al. | |
| 6,768,997 B2 | 7/2004 | Schirmer et al. | |
| 7,296,021 B2 | 11/2007 | Malkin et al. | |
| 7,461,059 B2 * | 12/2008 | Richardson et al. | |
| 8,341,143 B1 * | 12/2012 | Karls et al. | 707/708 |
| 2008/0275868 A1 | 11/2008 | Zer | |
| 2008/0301128 A1 | 12/2008 | Gandert et al. | |
| 2009/0144262 A1 | 6/2009 | White et al. | |

(Continued)

FOREIGN PATENT DOCUMENTS

EP    1003110    5/2000

OTHER PUBLICATIONS

International Search Report and Written Opinion for PCT/US2012/29327 mailed Jun. 7, 2012.

(Continued)

*Primary Examiner* — Hosain Alam
*Assistant Examiner* — Tuan-Khanh Phan
(74) *Attorney, Agent, or Firm* — Dinsmore & Shohl LLP

(57) ABSTRACT

Systems and methods for searching a document corpus and generating search queries are disclosed. A method includes providing for display a graphical user interface having two or more sections, and providing for generation of an initial search query based on locations of query terms entered into the graphical user interface. Sections of the graphical user interface indicate a query status. A revised search query based on a location of the query terms within the graphical user interface is generated following the manipulation of one or more of the query terms. Movement of a selected query term from a first section to a second section of the graphical user interface changes the query status of the selected query term from a first query status to a second query status. A search of the database is performed using the revised search query to return an updated set of electronic documents for display.

18 Claims, 11 Drawing Sheets

(56) References Cited

U.S. PATENT DOCUMENTS

2009/0216737 A1    8/2009  Dexter
2010/0299343 A1   11/2010  Ahari et al.
2011/0196852 A1*   8/2011  Srikanth et al. ............. 707/706

OTHER PUBLICATIONS

Extended European Search Report mailed on May 7, 2015 in European Patent Application No. 12761163.
JP Office Action dated Feb. 16, 2016 relating to Japanese Patent Application No. 2014-501154.

* cited by examiner

SYSTEMS AND METHODS FOR ENABLING SEARCHES OF A DOCUMENT CORPUS AND GENERATION OF SEARCH QUERIES

BACKGROUND

Field

The present specification generally relates to searching a document corpus using search queries and, more particularly, to systems and methods for searching a document corpus and generating search queries using a graphical user interface.

Technical Background

Currently, document corpuses such as those containing legal documents, patent documents, medical journals, etc. are searched using query expressions. These query expressions include operators such as Booleans operators (e.g., "and," "or," "and not," etc.) as well as relationship operators (e.g., W/S for words within the same sentence, W/# for words located within a defined number of words). A user may type the query expression and then initiate a search of the document corpus using the query expression. In some cases, user error may invalidate the query expression, such as when the user inadvertently leaves out a parenthesis, for example. In other cases, the query expression may not represent the user's intent and may search for documents other than what user intended.

Generally, query expressions may become very long and complicated depending on what the user is searching for. The development of reliable query expressions may require a significant amount of time, as well as a high level of expertise that an average user may not possess. Because of the aforementioned problems, many users may not trust their search of the document corpus, and may believe that the generated search results are unreliable, or the generated search results may be unreliable and users may erroneously rely on such unreliable results and thereby make poor or uninformed decisions.

Accordingly, a need exists for alternative methods of searching a document corpus and generating search queries.

SUMMARY

In one embodiment, a method for enabling a search of a document corpus includes providing for display a graphical user interface having two or more sections, and providing for generation of an initial search query based at least in part on locations of query terms entered into the graphical user interface. Each section of the graphical user interface indicates a query status, and the initial search query is used to search a database and return a set of returned electronic documents for display. The method further includes, in response to a manipulation of one or more of the query terms within the graphical user interface, providing, by a computer, for generation of a revised search query based on a location of the query terms within the graphical user interface following the manipulation of one or more of the query terms. A movement of a selected query term from a first section to a second section of the graphical user interface changes the query status of the selected query term from a first query status to a second query status. The method may further include providing for a search of the database using the revised search query to return an updated set of electronic documents for display.

In another embodiment, a method for enabling generation of a search query to search a database includes presenting a search string field requesting a submission of a search string, presenting a search initiation icon, and presenting a query development workspace comprising a plurality of sections. Each section corresponds to a query status. A selection of the search initiation icon initiates an initial search query based at least in part on the search string. The method further includes, in response to a selection of the search initiation icon, providing for generation of semantic terms based at least in part on the search string, providing for generation of the initial search query based at least in part on the semantic terms, and providing for a search of the database using the initial search query to return a set of returned electronic documents. The semantic terms are populated into the sections of the query development workspace in accordance with the query status of the semantic terms within the search query. In response to a manipulation of one or more semantic terms within the query development workspace, a revised search query is generated by a computer based on a location of the semantic terms within the sections of the query development workspace following manipulation of one or more of the semantic terms. A movement of a selected semantic term from a first section to a second section of the query development workspace changes the query status of the selected semantic term from a first query status to a second query status. The database is searched using the revised search query to return an updated set of electronic documents that are presented in a search results panel. The set of returned electronic document may also be presented in the search results panel.

In yet another embodiment, a system for enabling a search of a document corpus includes a computing device that includes a non-transitory memory component that stores a set of executable instructions. The set of executable instructions causes the computing device to generate semantic terms based at least in part on the search string in response to receipt of a search string, generate an initial search query based at least in part on the semantic terms, initiate a search of a database and return a set of returned electronic documents, and provide for display of a graphical user interface having two or more sections. Each section of the graphical user interface indicates a query status comprising an operator status, a relevance status, a relationship status, or combinations thereof. The set of executable instructions further causes the computer to provide for population of the graphical user interface with the semantic terms into the sections based at least upon the query status of the semantic terms within the initial search query, and, in response to a manipulation of one or more semantic terms within the graphical user interface, generate a revised search query based on a location of the semantic terms within the graphical user interface following a manipulation of one or more of the semantic terms. A movement of a selected semantic term from a first section to a second section of the graphical user interface changes the query status of the selected semantic term from a first query status to a second query status. The set of executable instructions further causes the computer to initiate an updated search of the database using the revised search query to return an updated set of electronic documents for display.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for searching a document corpus for documents of relative interest to a user. The embodiments described herein provide for visual and interactive graphical user interface that enable a user to manipulate query terms within the graphical user interface to change or otherwise modify a search query that is used to search the document corpus (e.g., change the relative importance of manipulated terms or change the Boolean status of terms). Graphical elements such as icons, font size, font color, location within the graphical user interface, etc. indicate to the user the query status of one or more query terms. In one embodiment, semantic terms are generated from a search string, wherein the semantic terms are utilized as the search terms, are populated into the graphical user interface, and used to query the document corpus. Various embodiments of systems and methods for searching a document corpus and generating a search query are described below.

Although the embodiments are described herein in the context of a document corpus containing patent documents, it should be understood that embodiments are not limited thereto. For example, the methods described herein may be utilized to search document corpuses containing patent documents, legal documents, scientific research documents, news articles, journals, etc.

Figure 1:
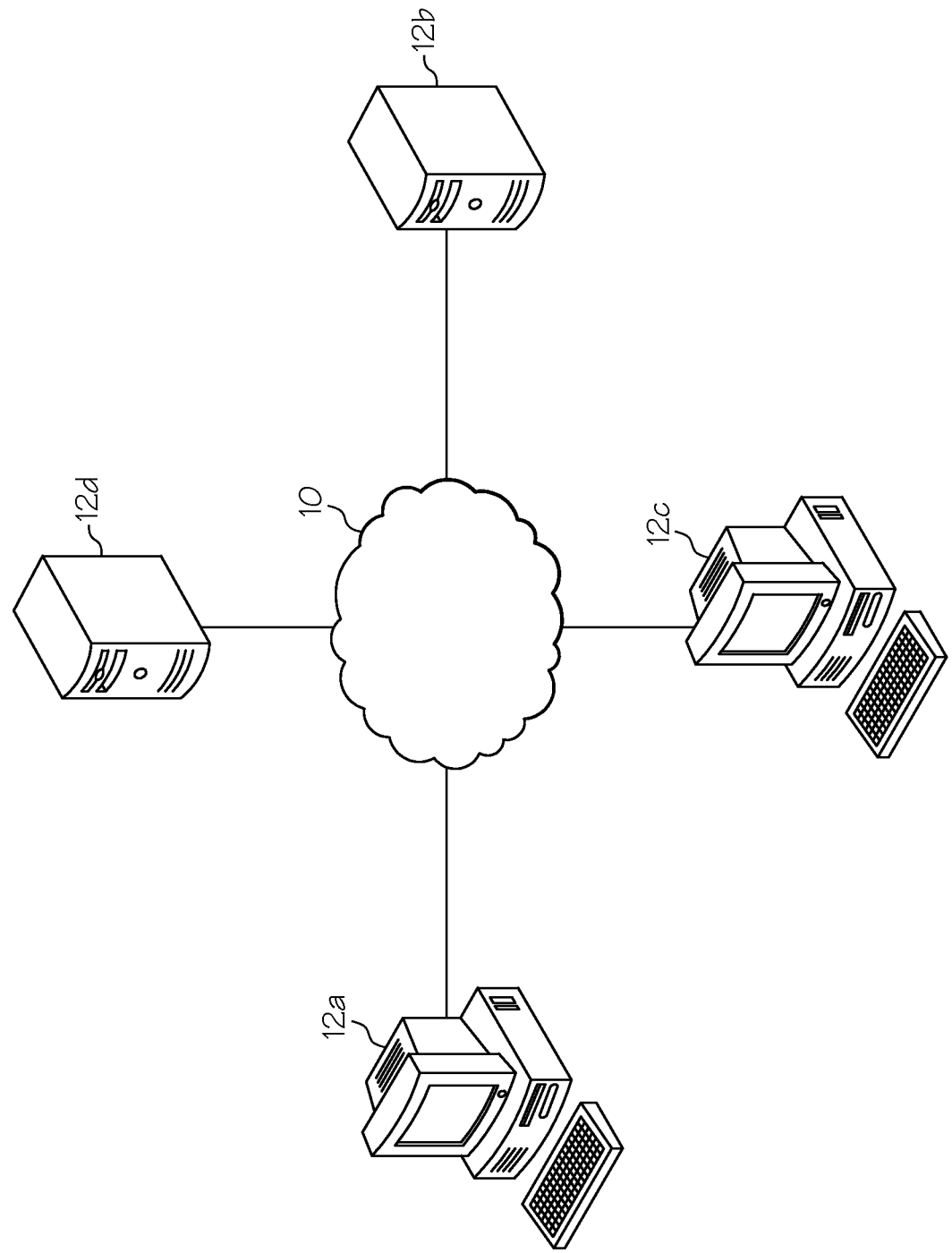
FIG. 1 depicts a schematic illustration of a computing network for a system for searching a document corpus and generating a search query, according to one or more embodiments shown and described herein.

Referring now to the drawings, FIG. 1 depicts an exemplary computing network, illustrating components for a system for searching a document corpus and generating search queries that may be used to search the document corpus, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used to input one or more documents into an electronic document corpus as well as perform searching of the document corpus. The user computing device 12a may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the network 10, may be used to input one or more documents into the electronic document corpus.

In one embodiment, the system further includes a semantic terms server 12d that is coupled to the network 10. The semantic terms server 12d may be configured as a server that receives search strings from the user computing device and/or the server computing device 12b, generates semantic terms based on the search strings using semantic terms logic and data, and provides semantic terms back to the server computing device 12b and/or the user computing device 12a. It is noted that semantic term generation will be described in more detail below.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
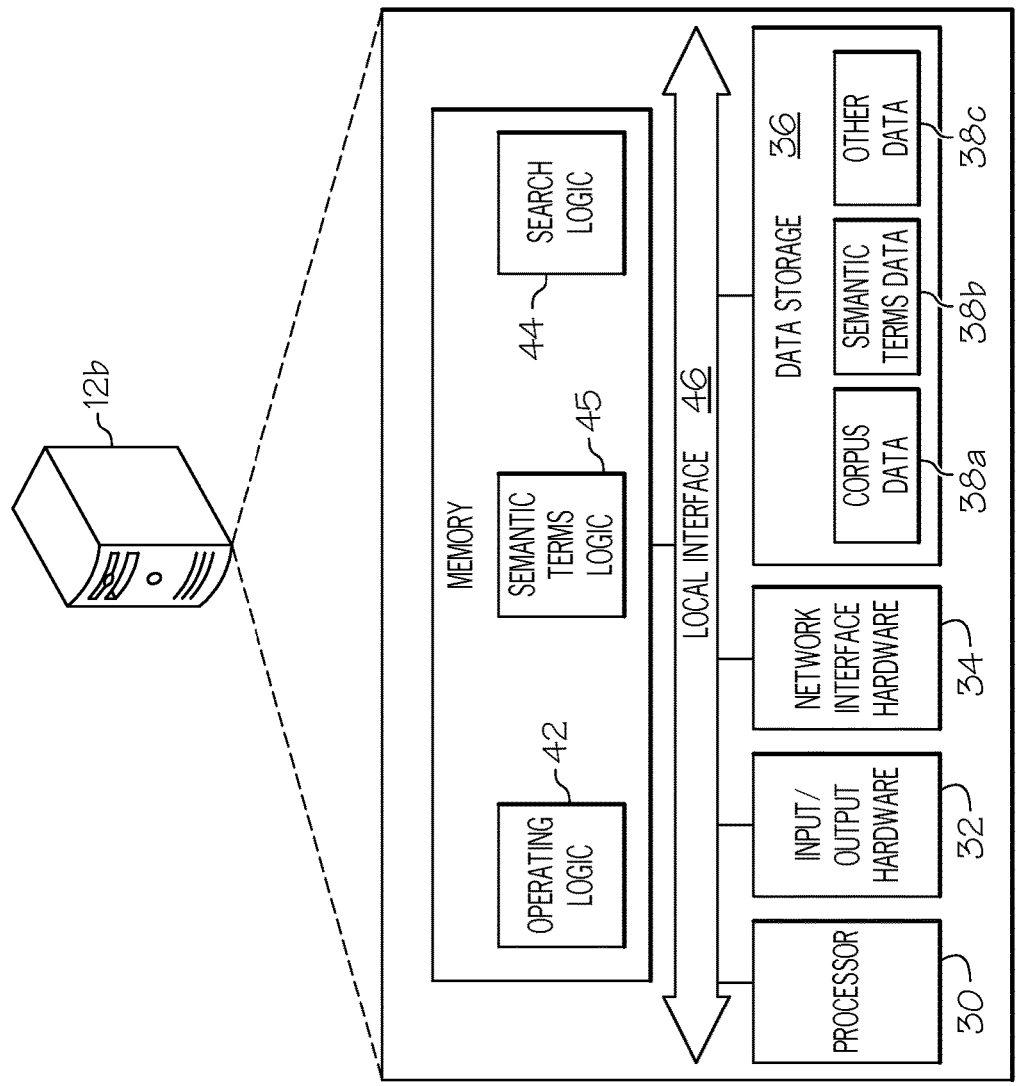
FIG. 2 depicts a schematic illustration of the server computing device from FIG. 1, further illustrating hardware and software that may be utilized in performing the document searching and search query generation functionality, according to one or more embodiments shown and described herein.

FIG. 2 depicts the server computing device 12b, from FIG. 1, further illustrating a system for searching a document corpus or generating search queries, and/or a non-transitory computer-readable medium for searching a document corpus or generating search queries embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store corpus data 38a, semantic terms data 38b, and other data 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42, semantic terms logic 43, and search logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store corpus data 38a, which in at least one embodiment includes patent and/or other documents that have been organized and indexed for searching. The patent documents may include issued patents and patent publications, for example. The corpus data 38a may be stored in one or more data storage devices. Similarly, semantic terms data 38b may be stored by the data storage component 36 and may include information relating to the generation of semantic search terms. In another embodiment, the server computing device 12b may be coupled to a remote server or data storage device (e.g., semantics terms server 12d) that comprises the semantic terms data such that the semantic terms are generated remotely from the server computing device 12b. Other data 38c may be stored in the data storage 36 to provide support for functionalities described herein (e.g., metadata that may be utilized in conjunction with the corpus data 38a to index the electronic documents stored within the document corpus).

Included in the memory component 40 are the operating logic 42, the semantic terms logic 43, and the search logic. The operating logic 42 may include an operating system and/or other software for managing components of the server computing device 12b. Similarly, the semantic terms logic 43 may reside in the memory component 40 and may be configured to facilitate electronic generation of the semantic terms from a provided search string. The search logic 44 may be configured to generate search queries from user-input within the graphical user interface, as described in detail below.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
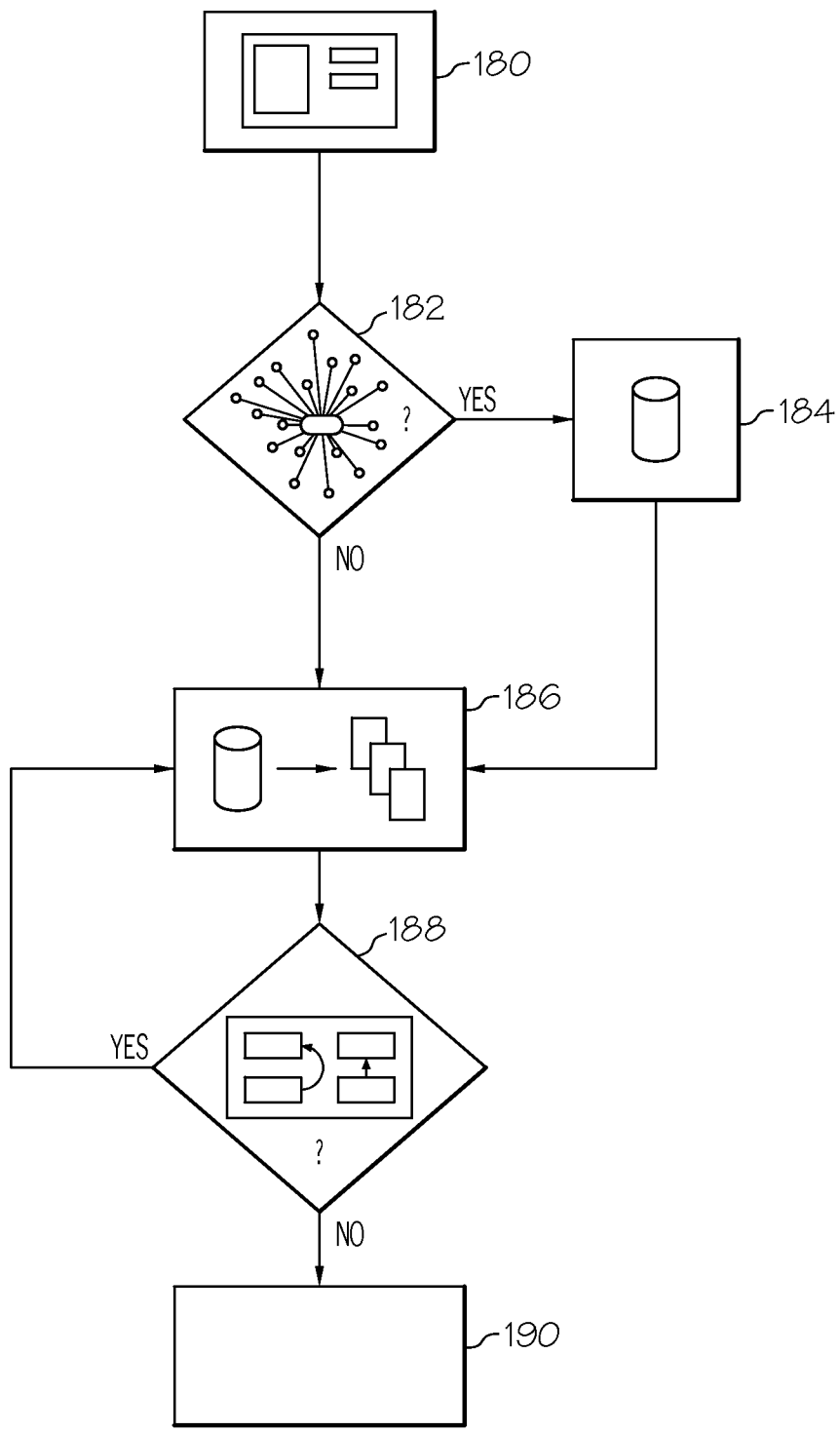
FIG. 3 depicts a flowchart graphically illustrating a method of searching a document corpus according to one or more embodiments shown and described herein.
Figure 4:
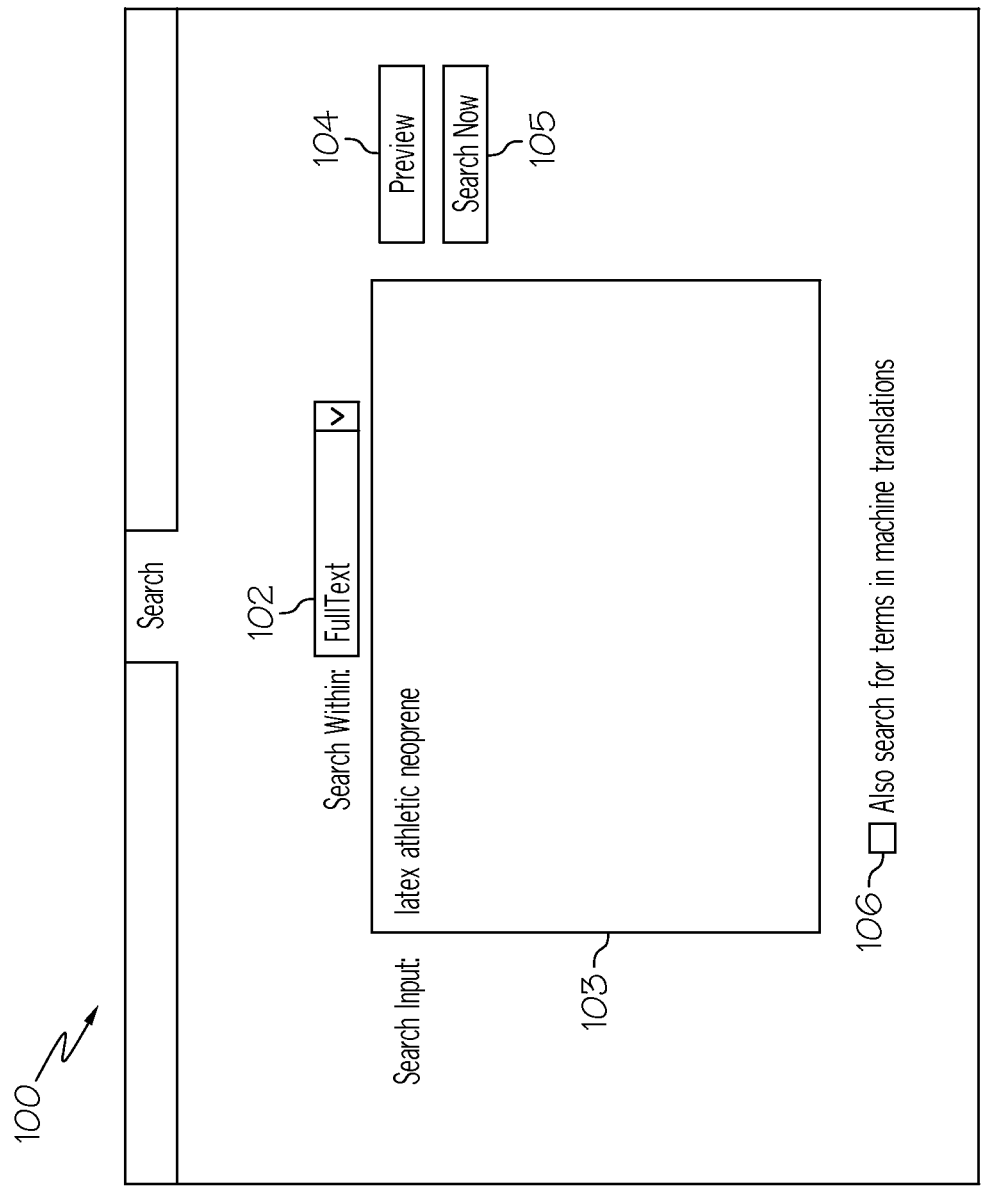
FIG. 4 depicts a schematic illustration of a search string input screen of a graphical user interface according to one or more embodiments shown and described herein.

Referring now to FIG. 3, a flow-chart that graphically illustrates a method of searching a document corpus according to one or more embodiments is provided. As described above, embodiments may enable a user to both visualize a search query used to query a database storing a document corpus (which may be organized by one or more collections of electronic documents) and graphically manipulate a search query to obtain desired electronic documents. At block 180, the system may generate a graphical user interface for display on a display device of the user computing device 12a. The graphical user interface is configured to request a submission of a search string from a user. Referring to FIG. 4, the graphical user interface may comprise a search string input screen 100 that is configured to receive a search string from a user. It should be understood that embodiments are not limited to the configurations of the graphical user interfaces illustrated throughout the figures, and that other graphical user interface configurations are possible. In one embodiment, the network 10 is the Internet and the graphical user interfaces described herein are presented to the user via a web browser.

The search string input screen 100 comprises a search string field 103 into which a user may enter one or more terms that make up a desired search string (e.g., by the use of a keyboard). In one embodiment, the search string may be a natural language search string. In the embodiment illustrated in FIG. 4, the search string "latex athletic neoprene" has been entered into the search string field 103, as the particular user may be interested in searching for patent documents stored within the document corpus that relate to materials used to manufacture athletic shoes.

The search string input screen 100 may also comprise other input features, such as an option button 106, a document section filter input 102, a preview icon 104, and a search initiation icon 105. It should be understood that more or fewer input features may be utilized. In the example illustrated in FIG. 4, option button 106 allows a user to also search machine translations of electronic documents that are not in the native language of the document corpus in which the user is searching. Other options may also be provided. The document section filter input 102 may enable a user to only search particular sections or combinations of sections of the electronic documents. For example, in the patent document context, the user may use the document section filter input 102 to search only the Abstract section, the Detailed Description section, the Claims section, etc.

In embodiments that utilize semantic terms, the preview icon 104 may allow the user to first see a preview of the semantic terms that are generated by the semantic terms logic 45 (FIG. 2) before initiating a search. For example, a list of semantic terms may be provided to the user. The user may then wish to initiate a search by clicking or otherwise selecting the search initiation icon 105, or change the search string entered into the search string field 103.

The user may initiate a search based on the search string entered into the search string field 103 by clicking or otherwise selecting the search initiation icon 105. Referring again to FIG. 3 (as well as FIG. 2) if semantic terms are utilized, at block 182 the search string is sent to the semantic terms logic 45 and the semantic terms data 38b to generate semantic search terms at block 184. The semantic terms are used as query terms of an initial search query that searches the document corpus at block 186. If semantic terms are not utilized, individual terms of the search string are used as the query terms of the initial search query that is used to search the document corpus at block 186.

Referring specifically to block 184, semantic terms are terms that are semantically similar to the originally provided terms of a search string. Semantic searching may be beneficial by utilizing related terms that the user of the system would not otherwise include in his or her search string. In one embodiment, the individual terms of the search string are sent to a third party service that generates semantic terms based on the search string (e.g., PureDiscovery Corporation of Dallas, Tex.). In another embodiment, the semantic terms are generated within the server computing device 12b. Semantic terms may be generated by a variety of techniques.

The semantic terms logic may not only generate the semantic terms, but also create a Boolean weighted natural language search query (i.e., an initial search query) that is applied to the document corpus to return a set of returned electronic documents at block 186. The initial search query may also be configured as a type of search other than a Boolean weighted natural language search query. The initial search query may be generated using any number of query generation techniques. The returned semantic terms may then be used as the query terms, wherein each query term has a query status associated therewith.

In an alternative embodiment, the user may not desire to utilize a semantic search at block 182. For example, in one embodiment there may be a selectable option provided within the search string input screen 100 that turns off the semantic search functionality. Or, alternatively, the system may not include the semantic search functionality. In these embodiments, the terms of the search string may be utilized as the query terms directly.

As described above, the query terms (e.g., the semantic terms or individual terms of the search string) of the initial search query are used to search the document corpus to return a set of returned electronic documents for display at block 186. At block 188, it is determined whether or not the initial search query has been manipulated or otherwise modified using the query development workspace described below. If the initial search query has not been manipulated, the process ends at block 190 with, in one embodiment, the user retrieving the desired documents. If the initial search query (as well as subsequent search queries) has been modified using the query development workspace, the revised search query is used to search the document corpus at block 186. The search query may be further manipulated and the document corpus further searched until the user is satisfied with the returned documents and the process ends at block 190.

Figure 5:
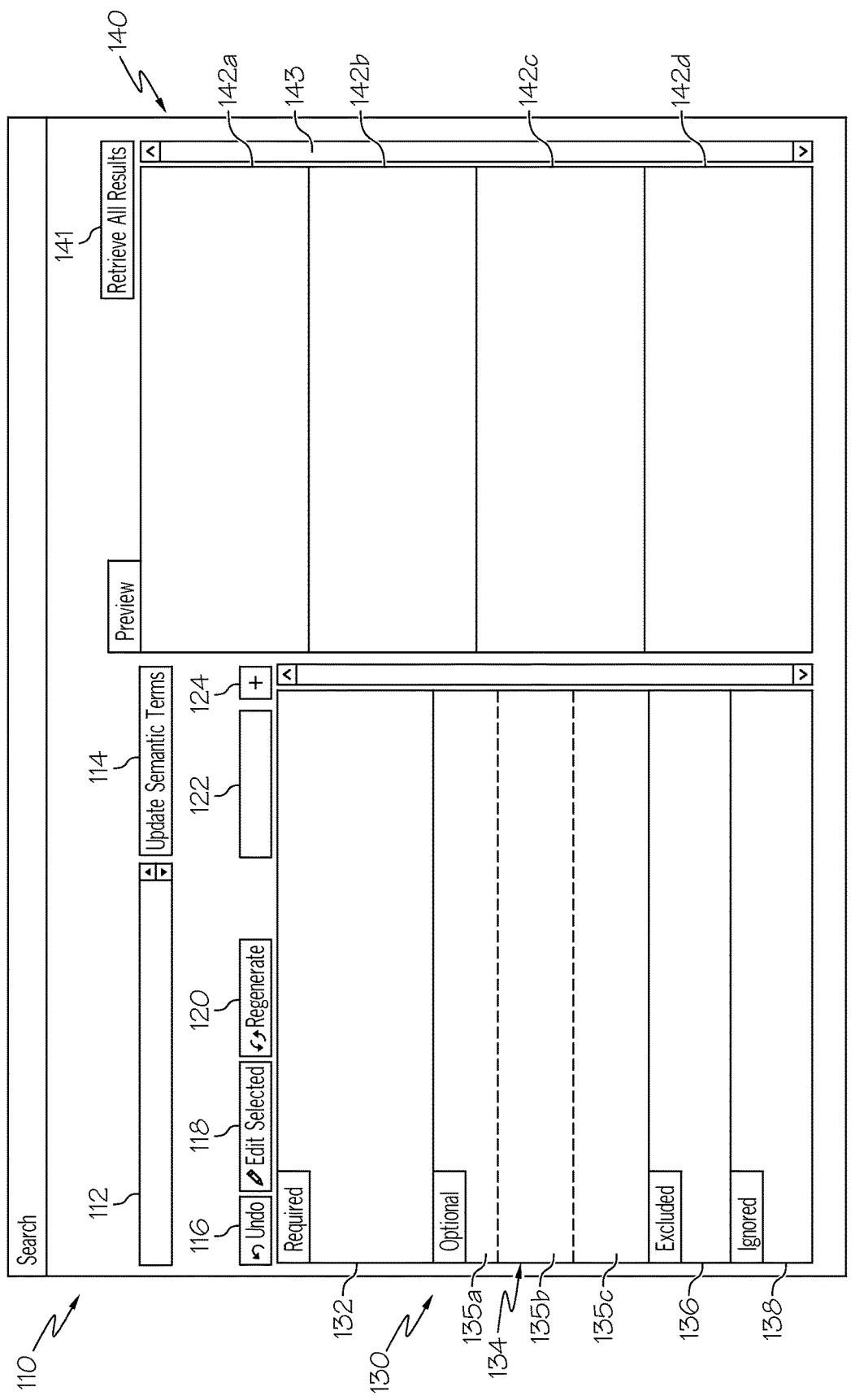
FIG. 5 depicts a schematic illustration of a query screen of a graphical user interface according to one or more embodiments shown and described herein.

Referring now to the embodiment illustrated in FIG. 5, the graphical user interface may comprise a query screen 110 that generally comprises a query development workspace 130 and a search results panel 140. In one embodiment, the query screen 110 is provided to the user after the generation of the initial search query. As described in more detail below, the query terms may be populated into the query development workspace 130 according to their associated query status within the initial query used to initially search the document corpus. In one embodiment, a search string input screen 100 is not utilized. Rather, the search string is entered directly into the query screen (e.g., using update semantic terms field 112 and update semantic terms button 114, described below).

The query development workspace 130 may be partitioned into a plurality of sections that delineate the query status of the query terms positioned therein. In this manner, a user of the query screen 110 may readily visualize the initial search query that was generated. In the embodiment depicted in FIG. 5, the query development workspace 130 comprises four sections: required term section 132, optional term section 134, an excluded term section 136, and an ignored term section 138. It should be understood that more or fewer sections may be utilized depending on the nature of the initial search query.

The query terms are treated according to their location within the query development workspace 130 when applied as the initial search query or subsequent revised search queries. The various sections of the query development may be indicative of an operator status. Operators of the operator status define a relationship between two or more query terms. For example, query terms located within the required term section 132 may be treated as a Boolean operator "and," meaning that those terms must be present in the returned electronic documents. Query terms located within the optional term section 134 may be treated as a Boolean operator "or," meaning that they are treated as optional within the search query. Query terms located in the excluded term section 136 may be treated as a Boolean "and not," meaning that returned electronic documents must not include such terms located in the excluded term section 136. Query terms located in the ignored term section 138 are terms that may be of limited relevance to the search and are not utilized in the initial or subsequent search queries.

As shown by the optional term section 134 of the query development workspace 130 depicted by FIG. 5, one or more of the sections may comprise a plurality of regions, wherein each region has an associated relevance weight. As an example and not a limitation, the illustrated optional term section 134 comprises a first region 135a, a second region 135b, and a third region 135c. The regions 135a-135c have a corresponding relevance weight associated therewith. For example, query terms within the first region 135a have a first relevance weight associated therewith; query terms within the second region 135b have a second relevance weight associated therewith; and query terms within the third region 135c have a third relevance weight associated therewith. For example, the first relevance weight may be greater than the second relevance weight, meaning that query terms within the first region 135a may be may weighted higher than query terms within the second region 135b in initial or subsequent revised search queries. More or fewer regions may be utilized. In one embodiment, the regions are visually delineated with a visual graphic, such as the dashed lines illustrated in FIG. 5. In an alternative embodiment, no visual graphic is used to delineate the various regions.

The search results panel 140 provides a window or portion of the query screen 110 that the returned electronic documents may be previewed or otherwise displayed. In the embodiment shown in FIG. 5, the search results panel 140 includes result sections 142a-142d, wherein a visual indication of a returned electronic document may be provided in each result section 142a-142d (e.g., the electronic documents returned in block 186 of FIG. 3). Any number of results sections may be provided, and the number of results sections may depend on the results of the particular query. In one embodiment, the search results panel 140 provides only a portion of the total number of returned electronic documents (e.g., the top 50 electronic documents). In another embodiment, all of the returned electronic documents are provided in the search results panel 140. A scroll bar 143 may be provided to enable the user to scroll through the returned electronic documents. The visual indication of the returned electronic documents may take on a variety of forms. In one embodiment, the title, a portion of the abstract section, and a representative figure of a patent document may appear in each result section 142a-142d. Other visual representations are also possible.

The query screen 110 may also include other components that enhance the functionality of the query development workspace 130 and the search results panel 140. In one embodiment, an update semantic terms field 112 and update semantic terms button 114 are provided to enable a user to modify the search string entered at the search string input screen 100. For example, the user may wish to add or remove terms from search string in the update semantic terms field 112 and then click or otherwise select the update semantic terms button 114 to regenerate the semantic terms that are used as the query terms of the initial search query.

In one embodiment, an undo button 116 may be provided to undo past manipulations of the query terms within the query development workspace 130, as described in detail below. An edit selected button 118 may be configured to enable a user to modify a query term (e.g., change its spelling), and a regenerate 120 button may be selected by the user to generate a revised search query based on a manipulation of the query terms within the query development workspace 130 to return an updated set of electronic documents in the search results panel 140. An add query term field 122 and an add query term button 124 may be provided to enable a user to enter his or her own query terms (whether or not semantic terms are utilized) into a revised search query. For example, a user may add a query term by typing the word into the add query term field 122 and then selecting the add query term button 124. The added query term may then be displayed within a section of the query development workspace 130 (e.g., the required term section 132). In another embodiment, an add query term button may not be provided, and the user may add a query term by typing the query term into the add query term field 122 and then dragging and dropping the added query term into the desired section of the query development workspace 130. Alternatively, the additional query terms may be added by typing the additional query terms directly into the desired sections of the query development workspace 130. Other methods of adding query terms to the query development workspace 130 may also be utilized.

In an alternative embodiment, the semantic terms (and/or new terms added by the user) are sent back to the semantic terms logic 45 and the semantic terms data 38b (before or after manipulation within the query development workspace 130) to return a new, updated set of query terms which can then be manipulated and used to search for documents as described above.

A retrieve all results button 141 may be provided to enable the user to retrieve all of the electronic documents presented in the search results panel 140. For example, the search results panel may only provide a selected number of returned electronic documents, and a selection of the retrieve all results button 141 may direct the user to a separate results screen that displays the entire set of returned electronic documents. The separate results screen may present the returned electronic documents in a format that is different than that of the search results panel 140 (e.g., more detail for each electronic document). The user may then decide to select, review, download, etc. individual electronic documents.

Figure 6:
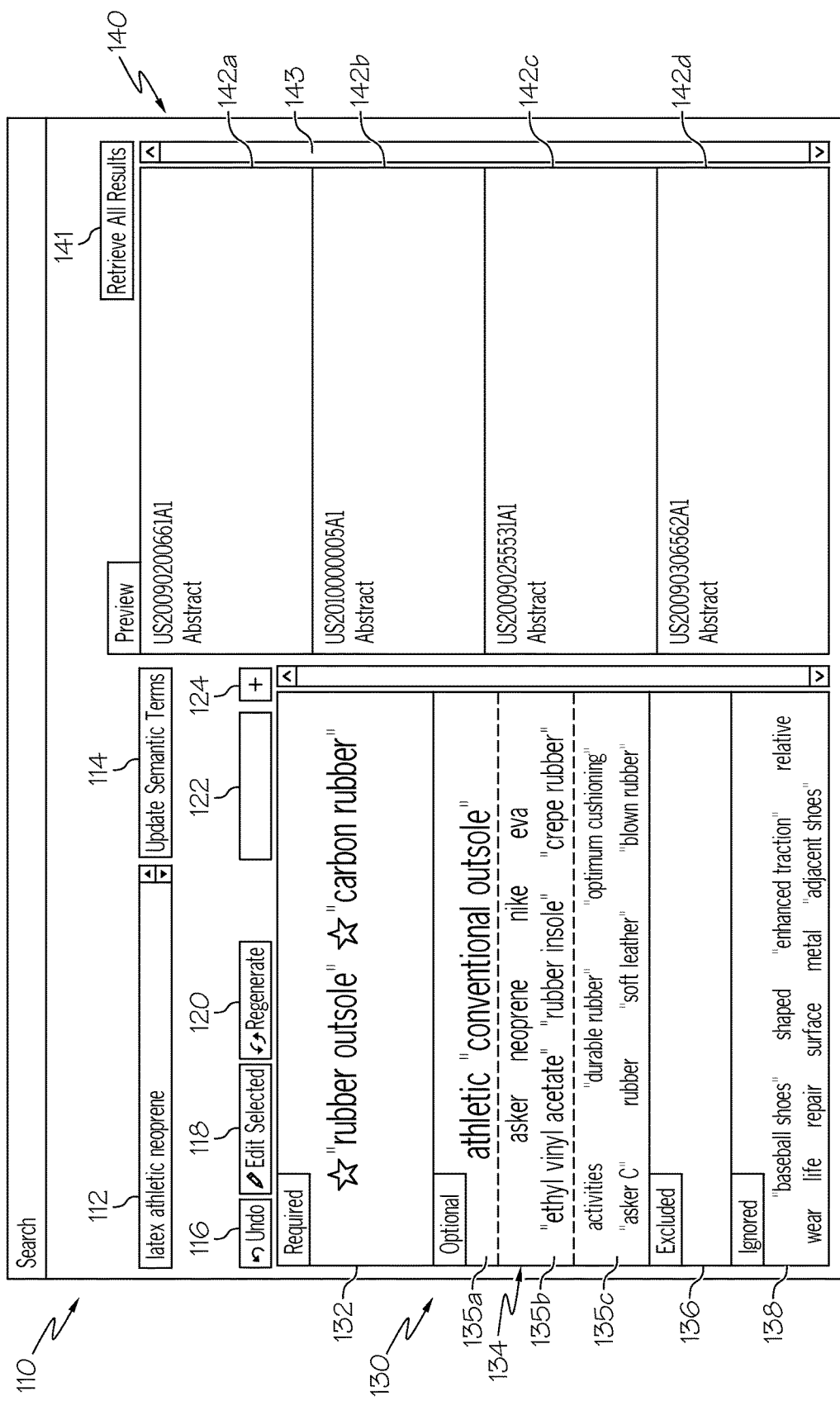
FIG. 6 depicts a schematic illustration of the query screen of FIG. 5 populated with exemplary query terms according to one or more embodiments shown and described herein.

FIG. 6 depicts a schematic illustration of a query screen 110 including query terms based on the semantic terms and initial search query resulting from the search string "latex athletic neoprene." The search string "latex athletic neoprene" appears in the update semantic terms field 112. The query terms of the initial search query appear in the query development workspace 130 based on their query status within the initial search query. It should be understood that the query terms depicted throughout the figures are for illustrative purposes only. The query terms illustrated in FIG. 6 result from semantic term generation as described above with respect to blocks 182 and 184 of FIG. 3. Accordingly, the illustrated query terms are semantic terms that are based on the search string "latex athletic neoprene."

The required term section 132 has been populated with two required query terms based on the initial search query: "rubber outsole" and "carbon rubber." The optional term section 134 has been populated with query terms such as "athletic," "conventional outsole," "asker," and "activities," among others. These terms are optional within the initial search query, as described above. No query terms were provided in the excluded term section 136, and query terms such as "baseball shoes," "shaped," etc. are provided in the ignored terms section 138 (i.e., these terms were ignored and provide no influence on the initial search query). It is noted that query terms may be one or more characters, and one or more words of a phrase.

In addition to the placement of query terms in the various sections of the query development workspace 130 (e.g., operator status), the query terms may also be formatted to further indicate their query status, such as a relevance status for example. As described above with respect to the first, second and third regions 135a-135c of the optional term section 134, the relevance status is indicative of the relevance weight assigned to the query term. The status-indicating format may be a font color, a font size, a font format, an icon, etc., that provides a visual cue to the user as to the particular query status. As an example and not a limitation, query terms having a bigger font associated therewith may have a relevance weight that is greater than a relevance weight associated with query terms having a smaller font. Similarly, a green font color may indicate a greater relevance weight than a red font color. Font formats such as bold, italics and underlining may also be utilized. In the example of FIG. 6, a star icon is used next to the query terms "rubber outsole" and "carbon rubber" to indicate to the user that the query terms are required and of the greatest relevance weight.

Referring specifically to the optional term section 134, the query terms of the initial search query are located within the regions 135a-135c of the optional term section 134 according to their query status. The query terms "athletic" and "conventional outsole" within the first region 135a have a bigger font than the font of the query terms "asker" and "neoprene" within the second region 135b. Similarly, query terms "asker" and "neoprene" have a font that is bigger than the font of the query terms "activities" and "durable rubber" within third region 135c. Accordingly, the query term "athletic" is weighted more heavily than the query terms "asker" and "activities" in the initial search query.

In this manner, the query development workspace 130 may provide a visual representation of the initial search query (and subsequent search queries based on query term manipulation, described in detail below). The location of the query terms within the query development workspace 130 and status-indicating format may provide visual cues that indicate to the user the status of query terms in the search query (e.g., operational status such as "and," "or," "and not," ignored, etc.; relevance status; and relationship status, described below). This visual representation may enable users of a document searching system to more fully understand the query that is being or that has been submitted.

Still referring to FIG. 6, the results of the initial search query are provided within the search results panel 140. For ease of illustration, each results section 142a-142d provides an Abstract header and the patent or patent application number only. Actual embodiments may provide a portion of the Abstract, the full title of the patent reference, and a representative drawing to provide a visual representation to the user so that the user may quickly determine the relevance of each returned electronic document. More or less detail regarding the electronic document may be provided in each results section 142a-142d.

The query development workspace 130 may enable a user to graphically manipulate the initial search query to further refine the initial search query and develop a revised search query, if necessary, to return a desired set of documents. As described in detail below and illustrated throughout the figures, query terms may be dragged and dropped, or otherwise moved throughout the query development workspace 130, to revise the query status of individual query terms and thereby create one or more revised search queries.

Figure 7:
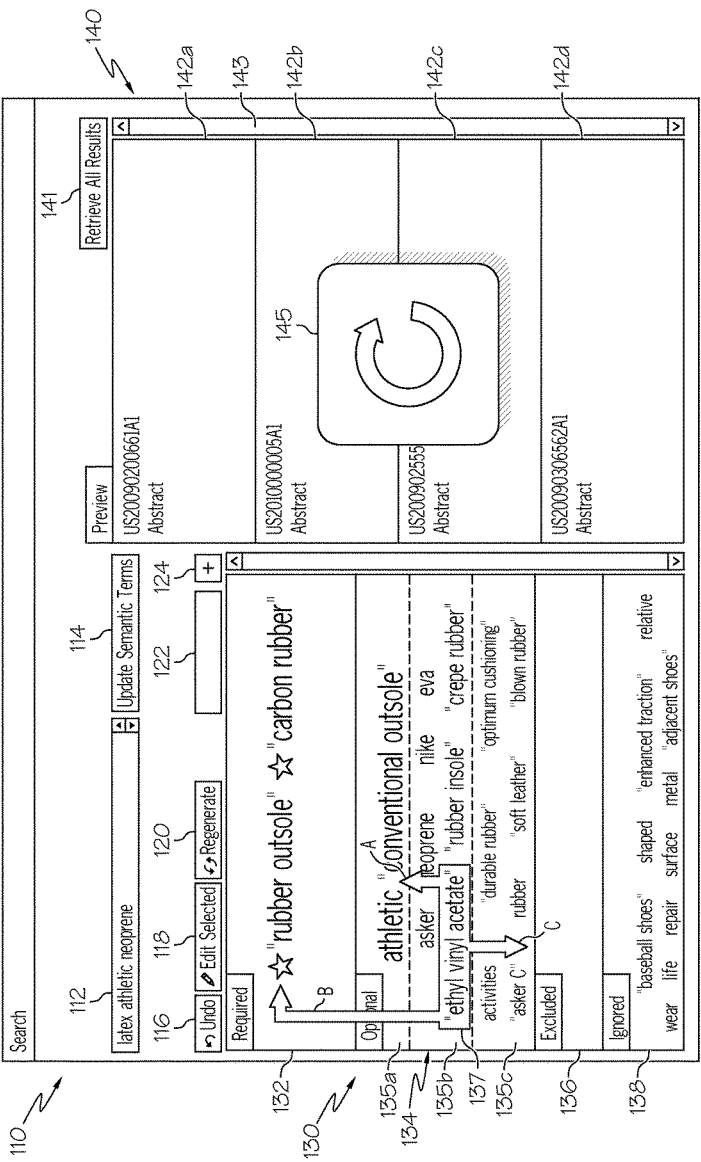
FIG. 7 depicts a schematic illustration of a manipulation of the populated query screen of FIG. 6 according to one or more embodiments shown and described herein.

Referring to FIG. 7, query terms may be dragged and dropped or otherwise moved within the query development workspace 130. As an example and not a limitation, a selected query term "ethyl vinyl acetate" (indicated by box 137) may be selected and moved from a first location (the second region 135b of the optional term section 134) to a second location to change its query status. For example, "ethyl vinyl acetate" may be moved by the user to the first region 135a of the optional term section 134 as indicated by arrow A. It is noted that box 137 and arrows A, B, and C are provided for illustration purposes only to aid in describing the manipulation of the query term "ethyl vinyl acetate," and that embodiments of the present disclosure may not display such a box and arrows. This manipulation would change the query status of "ethyl vinyl acetate" by increasing its relevance weight from the second relevance weight to the first relevance weight. In one embodiment, the status-indicating format of the query term "ethyl vinyl acetate" may also change as it is moved to the new location. For example, the font size may increase or change color to reflect the new query status. As another example, the query term "ethyl vinyl acetate" may be moved to the required term section 132 to make it a required query term in the revised search query as indicated by arrow B. Again, the status-indicating format of "ethyl vinyl acetate" may change to reflect the new query status resulting from the query term manipulation. As yet another example, "ethyl vinyl acetate" may also be moved to the third region 135c of the optional term section 134 as indicated by arrow C. It should be understood that the query term "ethyl vinyl acetate" may be excluded by moving it to the excluded term section 136 or ignored by moving it to the ignored term section 138. Any query term may be moved to any other section or region of the query development workspace 130 to modify the search query.

In one embodiment, manipulation of terms within the query development workspace 130 (e.g., movement of query terms, addition of query terms, removal of query terms, etc.) may prompt a visual indicator (e.g., refresh preview icon 145) to the user that the currently provided results in the search results panel are not in sync with the search query presently indicated by the query development workspace 130. For example, if the user moves the query term "ethyl vinyl acetate" as illustrated in FIG. 7, the refresh preview icon 145 may appear until the user searches the database using the revised search query that results from the manipulation of the query development workspace 130. In one embodiment, the user may initiate the revised search query by clicking or otherwise selecting the refresh preview icon 145. The visual indicator is not limited to the refresh preview icon 145 and may take on other forms. For example, the search results panel may change color (e.g., gray) to let the user now that he or she should re-initiate the search with the revised search query.

Similarly, a visual indicator may be provided within the query development workspace 130 when the text string in the update semantic terms field 112 is modified that may indicate to the user that the semantic terms within the query development workspace 130 is out of sync with the text string in the update semantic terms field 112. The visual indicator may be a changing of the color of the query development workspace 130, or use of an icon, for example. The visual icon may be removed after the user selects the update semantic terms button 114.

Figure 8:
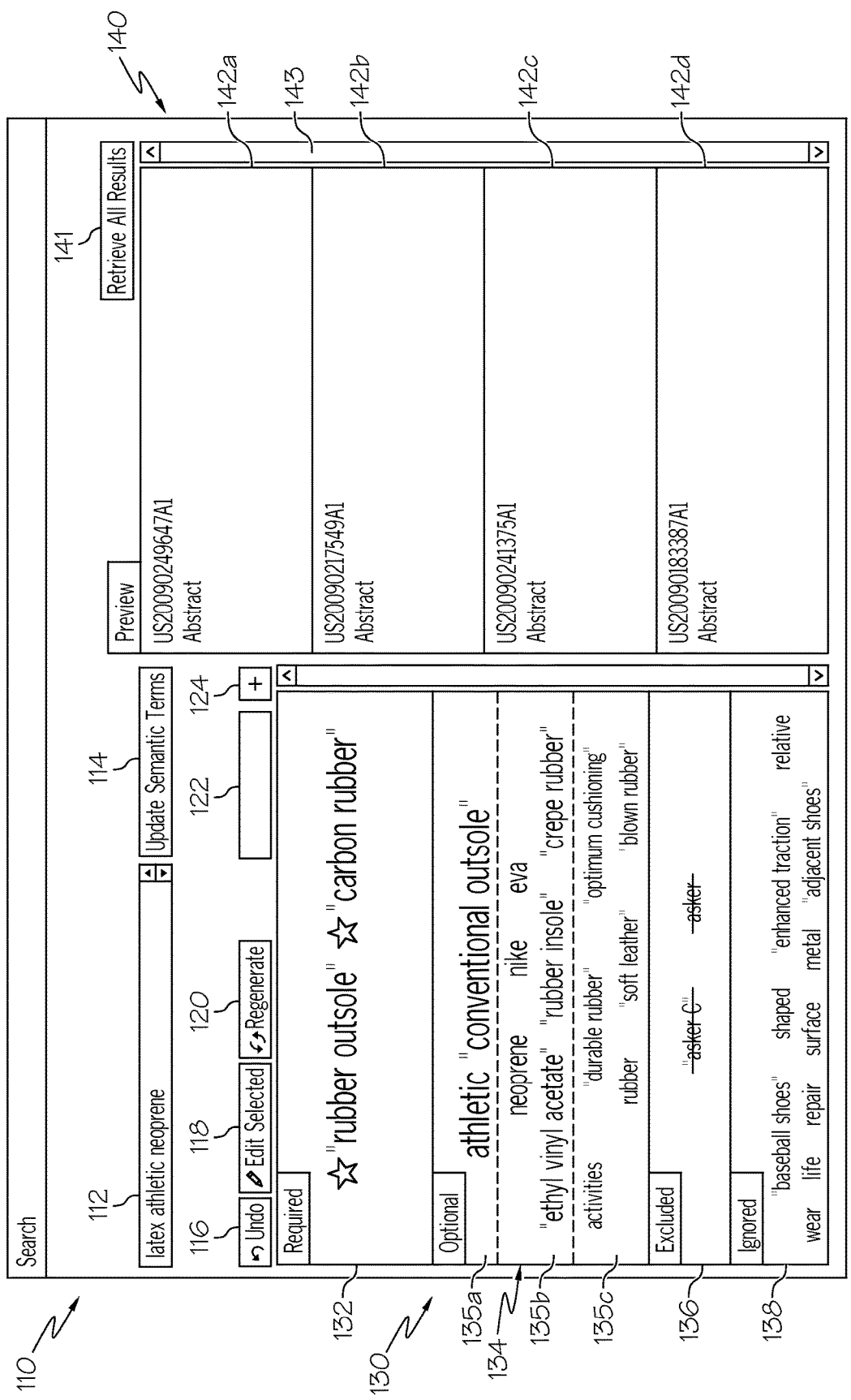
FIG. 8 depicts a schematic illustration of a manipulation of the populated query screen of FIG. 6 according to one or more embodiments shown and described herein.

FIG. 8 graphically depicts a manipulation of the query terms of the initial search query wherein the query terms "asker C" and "asker" were moved from the third region 135c of the optional term section 134 to the excluded term section 136. This manipulation results in a revised search query of which the query terms "asker C" and "asker" are to be treated as a Boolean "and not." As shown in FIG. 8, in one embodiment excluded terms are graphically depicted with a strike-through font. To regenerate the search query by searching the document corpus with the revised search query, the user may select the regenerate button 120 to once again search the document corpus (i.e., go from block 188 back to block 186 as shown in FIG. 3). A revised search query is created based on the manipulation of the query terms within the query development workspace 130, and the document corpus is searched using the revised search query.

In one embodiment, after the user initiates a subsequent search of the document corpus, a set of updated documents are displayed in the search results panel 140. It is noted that the patent references depicted in FIG. 8 are different than the patent references depicted in FIG. 7 due to the revised search query. The user may quickly view the change in search results based on his or her manipulation of the query terms within the query development workspace 130.

Figure 9:
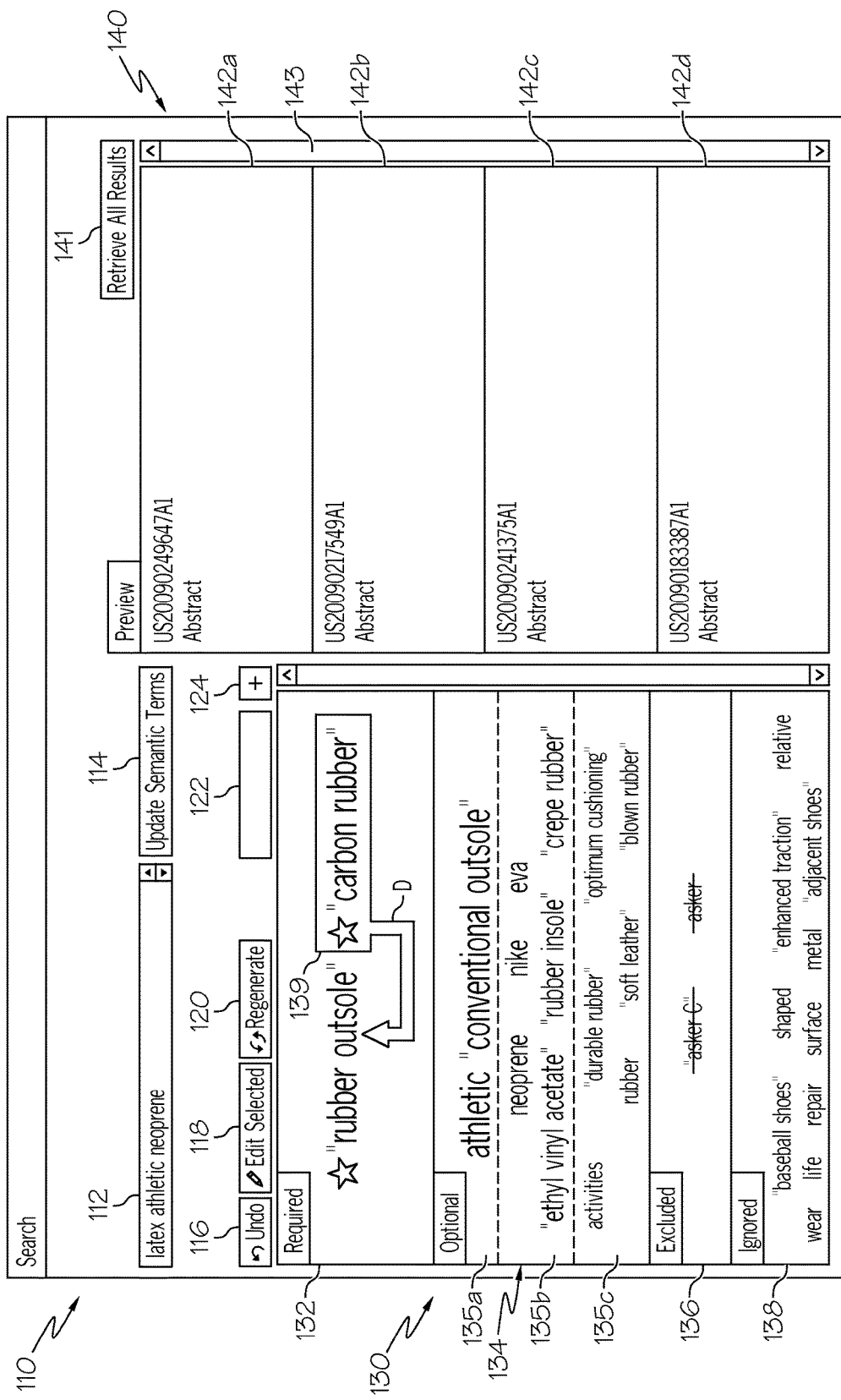
FIG. 9 depicts a schematic illustration of a manipulation of the populated query screen of FIG. 8 to generate an or-grouping box according to one or more embodiments shown and described herein.

The query development workspace 130 may also be used to modify a relationship status of the query status associated with query terms. The relationship status describes a relationship between a particular query term and one or more other query terms. FIG. 9 illustrates a revised search query as depicted in FIG. 8, and shows the term "carbon rubber" in the required term section 132 highlighted with a box 139 and manipulated by a user as indicated by arrow D. The user may select a first selected query term, such as "carbon rubber" in the present example, and drag and drop it onto (or proximate to) a second selected query term, such as the query term "rubber outsole." This action may cause the generation of a relationship box that defines a relationship between the two query terms.

Figure 10:
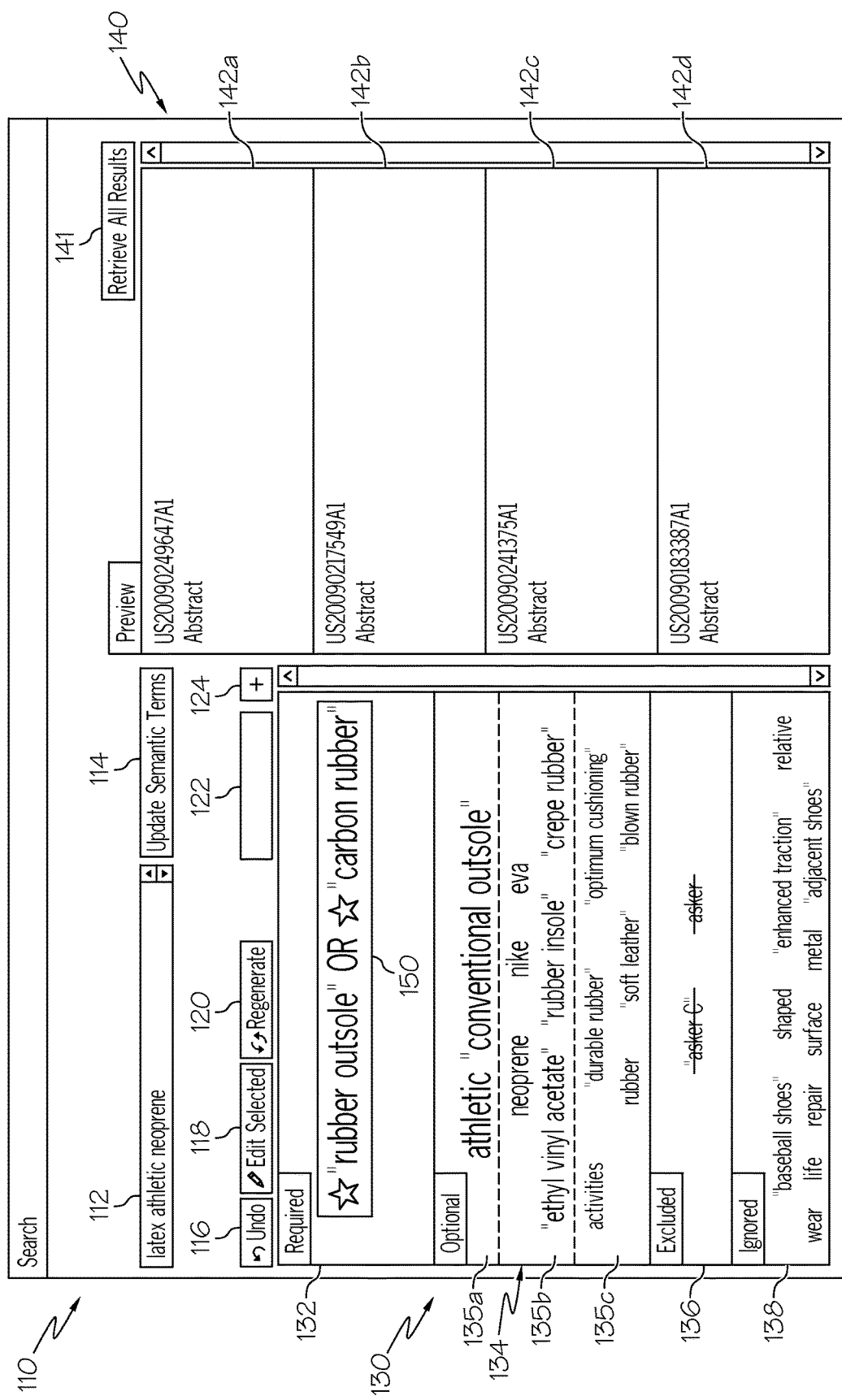
FIG. 10 depicts a schematic illustration of a populated query screen having an or-grouping box according to one or more embodiments shown and described herein.

FIG. 10 illustrates a relationship box configured as an or-grouping box 150 that defines a Boolean "or" operational status between the query terms "rubber outsole" and "carbon rubber." The effect of this or-grouping box is that the returned documents must have either the query term "rubber outsole" or the query term "carbon rubber" contained within the text of the document. More query terms may also be added to the or-grouping box 150, or additional or-grouping boxes may be generated. It should be understood that or-grouping boxes, as well as relationship boxes generally, may be generated by methods other than dragging and dropping query terms onto other query terms. Further, relationship boxes may be nested within one another to create specific relationships between terms.

Figure 11:
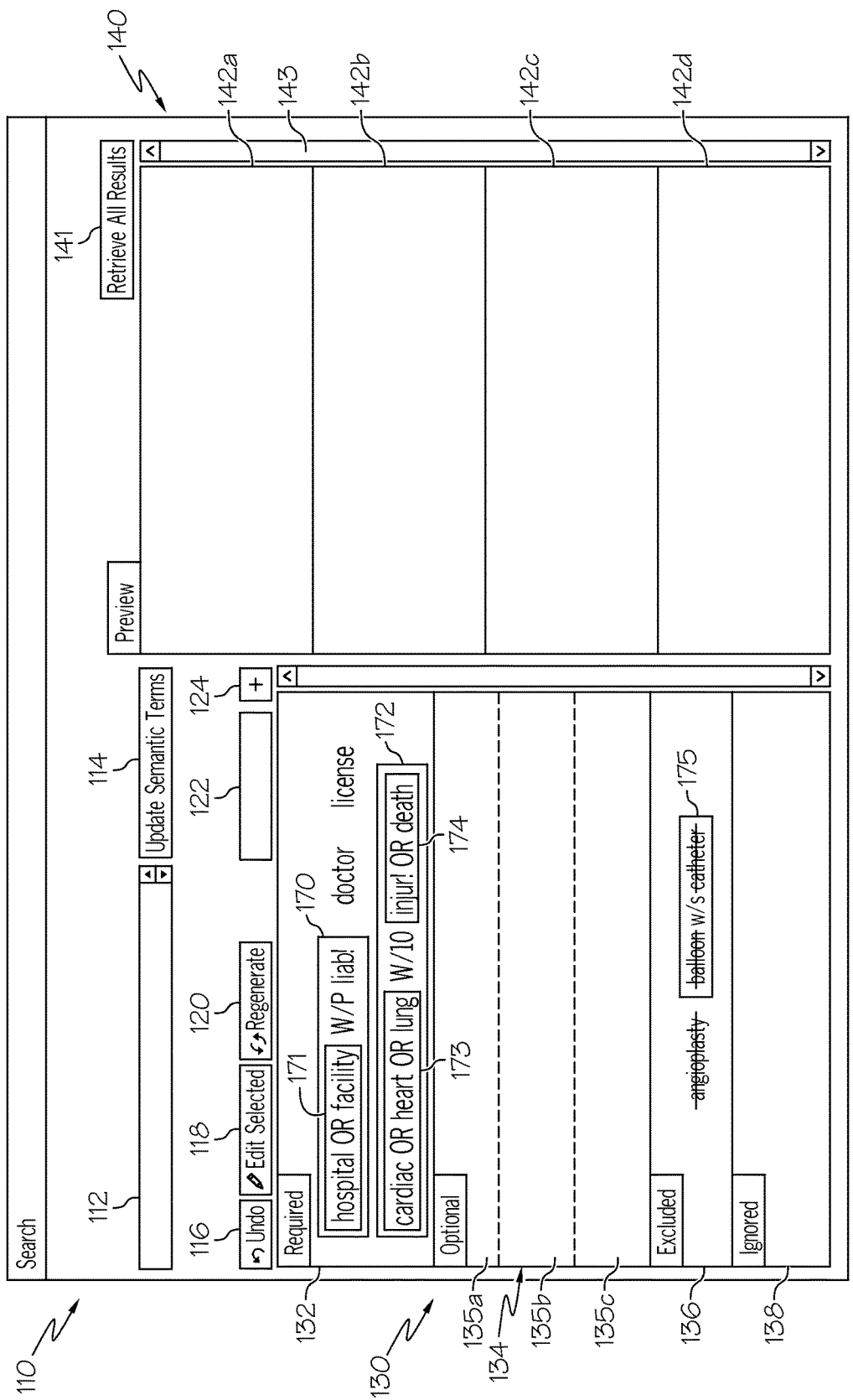
FIG. 11 depicts a schematic illustration of a populated query screen having a plurality of relationship boxes according to one or more embodiments shown and described herein.

Relationship boxes may define particular relationships between query terms other than the Boolean "or" operator. FIG. 11 illustrates an example of several relationship boxes of a search query relating to the field of medicine. The example provided in FIG. 11 is a visual representation of the following query expression:

doctor AND license AND hospital OR facility W/P liab!
  AND cardiac OR heart OR lung W/10 injur! OR death
  AND NOT angioplasty AND NOT balloon W/S catheter It is noted that the "!" is a word stemming operator that is used to find instances of a root of a word (e.g., liab!→liable, liability, etc.). The operator "W/10" dictates that the query terms are within 10 words of one another. The operator "W/S" dictates that the query terms are contained in a single sentence, and the operator "W/P" dictates that the query terms are contained in a single paragraph. Other operators may also be utilized.

A first relationship box 170 includes a nested or-grouping box 171 that is related to the term "liab!" by relationship operator W/P. The nested or-grouping box 171 provides for a "hospital" or a "facility." Accordingly, the first relationship box 170 states that the word "hospital" or "facility" must be found within the same paragraph as words containing "liab." A second relationship box 172 includes a first or-grouping box 173 and a second or-grouping box 174, the terms of which must be found within 10 words of each other. Also included in the required term section 132 are the words "doctor" and "license." Relationship box 175 in the excluded term section 136 states that documents containing the word "balloon" within the same sentence as "catheter" should be excluded from the set of returned documents. Additionally, the documents containing the word "angioplasty" should also be excluded.

The query development workspace 130 provides a graphical representation of the above query expression that is easier for the user to understand and manipulate, as it may be difficult for some users to understand long search strings. As stated above, the features described above may be implemented in a context other that patent document research, such as the searching of legal documents, medical and scientific journals, business and government records, etc.

It should be understood that embodiments described herein provide for systems and methods for searching a document corpus and developing a search query graphically. The graphical nature of the systems and methods described herein enable a user to easily understand and manipulate search queries, as well as predict how accurate or relevant search results will be as a result of modifying the search queries. Embodiments enable users to drag and drop query terms around the workspace to change the query and to create relationships to other query terms, rather than tediously editing a text-based query expression. Results may be previewed next to the workspace to illustrate how the user's changes affect the number and type of documents returned, as well as to encourage further experimentation with the development of the search query. The interface may allow users to easily visualize and manipulate complex queries and may decrease search time and increase the accuracy of search results. Further, the systems and methods described herein may enhance user trust in the search functionality as users may better understand how the searches are performed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for enabling a search of a document corpus, comprising:
   providing for display a graphical user interface having a first section and a second section;
   in response to receipt of a search string, providing for generation of semantic terms based at least in part on the search string;
   in response to receipt of the search string, providing for generation of an initial search query, wherein query terms of the initial search query include one or more of the semantic terms, wherein the initial search query is used to search a database and return a set of returned electronic documents for display;
   providing for display first query terms displayed within the first section of the graphical user interface and second query terms displayed within the second section of the graphical user interface, wherein the first query terms within the first section of the graphical user interface have a first status-indicating format associated therewith indicative of a first query status, the query terms within the second section of the graphical user interface have a second status-indicating format associated therewith indicative of a second query status, the first status-indicating format is different from the second status-indicating format, and the first query status is different from the second query status;
   in response to a movement of a selected query term from the first section to the second section of the graphical user interface, providing, by a computer, for generation of a revised search query based on a location of the selected query term within the graphical user interface following the movement of the selected query term, wherein the movement of the selected query term from the first section to the second section of the graphical user interface changes a query status of the selected query term from the first query status to the second query status; and
   providing for a search of the database using the revised search query to return an updated set of electronic documents for display.

2. The method of claim 1 wherein at least one of the first status-indicating format and the second status-indicating format is a font color, font size, font format, icon, or combinations thereof.

3. The method of claim 1 wherein at least one of the first query status and the second query status comprises an operator status, a relevance status, a relationship status, or combinations thereof.

4. The method of claim 3 wherein the operator status is one of an "and" operator, an "or" operator, an "and not" operator, and an ignore operator.

5. The method of claim 4 wherein the first section corresponds with a first operator status and the second section corresponds with a second operator status.

6. The method of claim 3 wherein the relevance status of the first query terms is based at least in part on the location of the first query terms within the first section of the graphical user interface.

7. The method of claim 6 wherein:
the first section comprises a first region and a second region;
the first query terms comprise third query terms within the first region and fourth query terms within the second region; and
the third query terms within the first region are assigned a first relevance weight, and the fourth query terms within the second region are assigned a second relevance weight within the initial search query or subsequent revised search queries.

8. The method of claim 7 wherein the movement of the selected query term from the first region to the second region changes a relevance weight of the selected query term from the first relevance weight to the second relevance weight.

9. The method of claim 7 wherein the first section further comprises an additional region having an additional relevance weight.

10. The method of claim 1 further comprising in response to a placement of a first selected query term proximate a second selected query term:
providing for display of an or-grouping box that includes the first selected query term and the second selected query term; and
providing, by the computer, for generation of the revised search query such that the revised search query includes a Boolean "or" operator between the first selected query term and the second selected query term.

11. The method of claim 1 further comprising:
providing for display of a visual indication of a manipulation of a query development workspace prior to providing for a search of the database using the revised search query to return the updated set of electronic documents for display; and
providing for display of the updated set of electronic documents after the search of the database using the revised search query to return the updated set of electronic documents for display.

12. A method for enabling generation of a search query to search a database, comprising:
presenting a search string field requesting a submission of a search string;
presenting a search initiation icon, wherein a selection of the search initiation icon initiates an initial search query based at least in part on the search string;
presenting a query development workspace comprising a first section and a second section;
in response to the selection of the search initiation icon, providing for:
generation of semantic terms based at least in part on the search string;
generation of the initial search query based at least in part on the semantic terms; and
search of the database using the initial search query to return a set of returned electronic documents;
providing for display first semantic terms displayed within the first section of the query development workspace and second semantic terms displayed within the second section of the query development workspace, wherein the first semantic terms within the first section of the query development workspace have a first status-indicating format associated therewith indicative of a first query status, the semantic terms within the second section of the query development workspace have a second status-indicating format associated therewith indicative of a second query status, the first status-indicating format is different from the second status-indicating format, and the first query status is different from the second query status;
in response to a movement of a selected semantic term from the first section to the second section of the query development workspace, providing, by a computer, for generation of a revised search query based on a location of the selected semantic term within the sections of the query development workspace following the movement of the selected semantic term, wherein the movement of the selected semantic term from the first section to the second section of the query development workspace changes a query status of the selected semantic term from the first query status to the second query status;
providing for a search of the database using the revised search query to return an updated set of electronic documents for display; and
presenting a search results panel that graphically indicates the set of returned electronic documents and/or the updated set of electronic documents.

13. The method of claim 12 wherein:
at least one of the first query status and the second query status comprises an operator status, a relevance status, a relationship status, or combinations thereof;
the operator status is one of an "and" operator, an "or" operator, an "and not" operator, and an ignore operator;
the first section corresponds with a first operator status and the second section corresponds with a second operator status; and
the relevance status of the first semantic terms is based at least in part on the location of the first semantic terms within the first section of the query development workspace.

14. The method of claim 12 further comprising in response to a placement of a first selected semantic term to a location that is proximate to a second selected semantic term:
providing for generation of a relationship box that includes the first selected semantic term and the second selected semantic term; and
providing, by the computer, for generation of the revised search query such that the revised search query includes an operator between the first selected semantic term and the second selected semantic term.

15. A system for enabling a search of a document corpus, comprising:
a computing device that comprises a non-transitory memory component that stores a set of executable instructions that causes the computing device to:
in response to receipt of a search string, generate semantic terms based at least in part on the search string;
in response to receipt of the search string, generate an initial search query based at least in part on the semantic terms, wherein query terms of the initial search query include one or more of the semantic terms,
initiate a search of a database using the initial search query and return a set of returned electronic documents;

provide for display of a graphical user interface having a first section and a second section;

provide for display first semantic terms displayed within the first section of the graphical user interface and second semantic terms displayed within the second section of the graphical user interface, wherein the first semantic terms within the first section of the graphical user interface have a first status-indicating format associated therewith indicative of a first query status, the semantic terms within the second section of the graphical user interface have a second status-indicating format associated therewith indicative of a second query status, the first status-indicating format is different from the second status-indicating format, and the first query status is different from the second query status;

in response to a movement of a selected semantic term from the first section to the second section of the graphical user interface, generate a revised search query based on a location of the selected semantic term within the graphical user interface following the movement of the selected semantic term, wherein the movement of the selected semantic term from the first section to the second section of the graphical user interface changes a query status of the selected semantic term from the first query status to the second query status; and initiate an updated search of the database using the revised search query to return an updated set of electronic documents for display.

16. The system of claim 15 wherein the set of executable instructions further causes the computing device to:

generate a relationship box that includes a first selected semantic term and a second selected semantic term; and generate the revised search query such that the revised search query includes an operator between the first selected semantic term and the second selected semantic term.

17. A method for enabling a search of a document corpus, comprising:

providing for display a graphical user interface having a first section and a second section;

in response to receipt of a search string, providing for generation of semantic terms based at least in part on the search string;

in response to receipt of the search string, providing for generation of an initial search query, wherein query terms of the initial search query include one or more of the semantic terms, wherein the initial search query is used to search a database and return a set of returned electronic documents for display;

providing for display first query terms displayed within the first section of the graphical user interface and second query terms displayed within the second section of the graphical user interface, wherein the first query terms within the first section of the graphical user interface have a first status-indicating format associated therewith indicative of a first query status, the query terms within the second section of the graphical user interface have a second status-indicating format associated therewith indicative of a second query status, the first status-indicating format is different from the second status-indicating format, and the first query status is different from the second query status;

in response to dragging a selected query term from the first section and dropping the selected query term into the second section of the graphical user interface, providing, by a computer, for generation of a revised search query based on a location of the selected query term within the graphical user interface following the dragging and dropping of the selected query term, wherein the dragging and dropping of the selected query term from the first section to the second section of the graphical user interface changes a query status of the selected query term from the first query status to the second query status; and providing for a search of the database using the revised search query to return an updated set of electronic documents for display.

18. The method of claim 1, further comprising, in response to manipulating the query terms within the graphical user interface, providing for generation of a visual indicator, wherein activation of the visual indicator initiates a search of the database using the revised search query.

* * * * *